(12) United States Patent
Xu et al.

(10) Patent No.: US 10,339,021 B2
(45) Date of Patent: Jul. 2, 2019

(54) METHOD AND APPARATUS FOR OPERATING HYBRID STORAGE DEVICES

(71) Applicant: EMC IP HOLDING COMPANY LLC, Hopkinton, MA (US)

(72) Inventors: Xinlei Xu, Beijing (CN); Jian Gao, Beijing (CN); Lifeng Yang, Beijing (CN); Huadong Li, Beijing (CN); Changyu Feng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 193 days.

(21) Appl. No.: 15/387,908

(22) Filed: Dec. 22, 2016

(65) Prior Publication Data
US 2017/0192702 A1 Jul. 6, 2017

(30) Foreign Application Priority Data
Dec. 31, 2015 (CN) .......................... 2015 1 1021593

(51) Int. Cl.
| | | |
|---|---|---|
| G06F 11/00 | (2006.01) | |
| G06F 11/20 | (2006.01) | |
| G06F 3/06 | (2006.01) | |
| G06F 11/07 | (2006.01) | |
| G06F 11/10 | (2006.01) | |

(52) U.S. Cl.
CPC .......... *G06F 11/2094* (2013.01); *G06F 3/068* (2013.01); *G06F 3/0608* (2013.01); *G06F 3/0616* (2013.01); *G06F 3/0659* (2013.01); *G06F 11/0727* (2013.01); *G06F 11/0751* (2013.01); *G06F 11/0793* (2013.01); *G06F 11/1076* (2013.01)

(58) Field of Classification Search
CPC ............ G06F 11/2094; G06F 11/0793; G06F 11/0751; G06F 11/0727; G06F 3/068; G06F 3/0616; G06F 3/0608; G06F 3/0659
USPC .......................................................... 714/16
See application file for complete search history.

(56) References Cited

U.S. PATENT DOCUMENTS

| | | | | |
|---|---|---|---|---|
| 8,902,536 B1 * | 12/2014 | Hwang | .............. | G11B 5/59627 360/75 |
| 8,947,806 B1 * | 2/2015 | Oenning | ................ | G11B 5/012 360/39 |
| 9,093,119 B1 * | 7/2015 | Hwang | ............ | G11B 20/10009 |
| 9,946,495 B2 * | 4/2018 | Iyigun | ..................... | G06F 3/068 |
| 2010/0241815 A1 * | 9/2010 | McManis | .............. | G06F 3/0611 711/154 |

(Continued)

FOREIGN PATENT DOCUMENTS

| | | |
|---|---|---|
| CN | 102439557 | 5/2012 |
| CN | 102667704 | 9/2012 |

(Continued)

*Primary Examiner* — Yair Leibovich
(74) *Attorney, Agent, or Firm* — BainwoodHuang

(57) ABSTRACT

Embodiments of the present disclosure relate to a method and an apparatus for operating a hybrid storage device, the hybrid storage device including a storage device of a first type and a storage device of a second type that is different from the first type, the method comprising: synchronously writing data in the storage device of the first type and the storage device of the second type. By using the embodiments of the present disclosure, the actual storage space may be increased, and the service life of the storage device may be prolonged.

4 Claims, 6 Drawing Sheets

(56) References Cited

U.S. PATENT DOCUMENTS

| | | | | |
|---|---|---|---|---|
| 2011/0010488 A1* | 1/2011 | Aszmann | ............... | G06F 3/0608 |
| | | | | 711/103 |
| 2011/0153931 A1* | 6/2011 | Bell, Jr. | ................. | G06F 3/0611 |
| | | | | 711/114 |
| 2011/0202716 A1* | 8/2011 | Nakagawa | ........... | G06F 12/0868 |
| | | | | 711/113 |
| 2011/0264949 A1* | 10/2011 | Ikeuchi | ................ | G06F 11/1076 |
| | | | | 714/6.22 |
| 2012/0059978 A1* | 3/2012 | Rosenband | ............ | G06F 3/0613 |
| | | | | 711/103 |
| 2012/0109936 A1* | 5/2012 | Zhang | ................ | G06F 17/30312 |
| | | | | 707/713 |
| 2012/0215966 A1* | 8/2012 | Fukuyama | ........... | G06F 11/2069 |
| | | | | 711/103 |
| 2012/0311195 A1* | 12/2012 | Chang | .................... | G06F 9/4411 |
| | | | | 710/14 |
| 2014/0040349 A1* | 2/2014 | Matsuba | .............. | H04L 67/1097 |
| | | | | 709/203 |
| 2014/0189043 A1* | 7/2014 | Yang | ................... | H04L 67/1097 |
| | | | | 709/214 |
| 2014/0201175 A1* | 7/2014 | Ohno | ................. | G06F 17/30153 |
| | | | | 707/693 |
| 2015/0278019 A1* | 10/2015 | Fagiano | .............. | G06F 11/2069 |
| | | | | 714/6.23 |
| 2015/0332755 A1* | 11/2015 | Singh | .................... | G11C 11/419 |
| | | | | 365/72 |
| 2016/0036653 A1* | 2/2016 | Deguchi | ................ | G06F 3/0635 |
| | | | | 709/219 |
| 2018/0349063 A1* | 12/2018 | Matsushita | ................ | G06F 3/06 |

FOREIGN PATENT DOCUMENTS

| | | |
|---|---|---|
| CN | 103150128 | 6/2013 |
| CN | 103970684 | 8/2014 |

* cited by examiner

METHOD AND APPARATUS FOR OPERATING HYBRID STORAGE DEVICES

RELATED APPLICATIONS

This application claim priority from Chinese Patent Application Number CN201511021593.0, filed on Dec. 31, 2015 at the State Intellectual Property Office, China, titled "METHOD AND APPARATUS FOR OPERATING HYBRID STORAGE DEVICE" the contents of which is herein incorporated by reference in its entirety.

FIELD

The present disclosure relates to the electronic field, and more specifically relates to a method and an apparatus for operating storage deices with a plurality of different types.

BACKGROUND

With the development of computer storage device technologies, more and more computing devices use faster storage devices, e.g., solid-state disk (SSD). SSDs have a performance advantage of high-speed read/write, but have a shorter service life than traditional mechanical hard disks; besides, frequent write into SSDs will reduce their service life.

On one hand, SSDs may be used to replace traditional mechanical hard disks to provide faster data read/write performance, and on the other hand, they may also be configured for caching to enhance performance of computing devices. For example, in the field of data storage devices, SSDs may be combined with mechanical hard disks to provide a large-capacity and relative-fast storage scheme. Besides, for the sake of data security, SSDs usually utilize RAID (e.g., RAID1, RAID2) technologies to ensure data security.

SUMMARY

Generally, embodiments of the present disclosure relate to a method and an apparatus for operating a hybrid storage device.

According to a first aspect, there is provided a method for operating a hybrid storage device, the hybrid storage device including a storage device of a first type and a storage device of a second type different from the first type, the method comprising: synchronously writing data into the storage device of the first type and the storage device of the second type.

In one embodiment, the method further comprise in response to a success of the writing, determining not to update metadata in the storage device of the first type.

In one embodiment, the hybrid storage device further includes a volatile memory, and the method further comprises: in response to a failure of the synchronous writing, transmitting information indicating failure of writing the data from the non-volatile memory to a host; and synchronously receiving the data rewritten from the host into the storage device of the first type and the storage device of the second type.

In one embodiment, the method further comprises: in response to the failure of the writing setting the data failing to be written in the storage device of the first type as invalid data; and updating metadata in the storage device of the first type.

In one embodiment, the hybrid storage device further includes a volatile memory, and the method further comprises: in response to a failure of the synchronous writing, transmitting, the volatile memory, information indicating success of writing the data to the host; and rewriting the data in the storage device of the first type till success.

In one embodiment, the method further comprises: in response to a failure of the writing, updating metadata in the storage device of the first type; writing the data in the storage device of the first type using the data written into the storage device of the second type; and updating again the metadata in the storage device of the first type.

According to another aspect, there is provided an apparatus for a hybrid storage device, the hybrid storage device including a storage device of a first type and a storage device of a second type different from the first type, the apparatus including a processing unit configured to: synchronously write data into the storage device of the first type and the storage device of the second type.

It is to be understood that this part is not intended to identify key or essential features of the embodiments of the present disclosure, also not intended to limit the scope of the present disclosure. Other features of the present disclosure will become easy to be understood through the description below.

BRIEF DESCRIPTION OF THE DRAWINGS

Through more detailed description of some embodiments of the present disclosure in the accompanying drawings, the above and other advantages, features and objects of the present disclosure will become more apparent, wherein.

In all figures, same or similar reference numerals represent same or similar elements.

DETAILED DESCRIPTIONS

The principle of the present disclosure will be described with reference to some exemplary embodiments. It is to be understood that these embodiments are described only for a purpose of illustration and helping those skilled in the art understand and implement the present disclosure, not suggesting any limitations to the scope of the present disclosure. The content of the present disclosure described here may be implemented in various manners other than the manner described below.

As illustrated herein, the term "comprise" and its various variants is to be understood as open terms, meaning "including, but not limited to." The term "based on" is toy be understood as "at least partially based on." The term "another embodiment" is to be understood as "at least one other embodiment."

Figure 4:
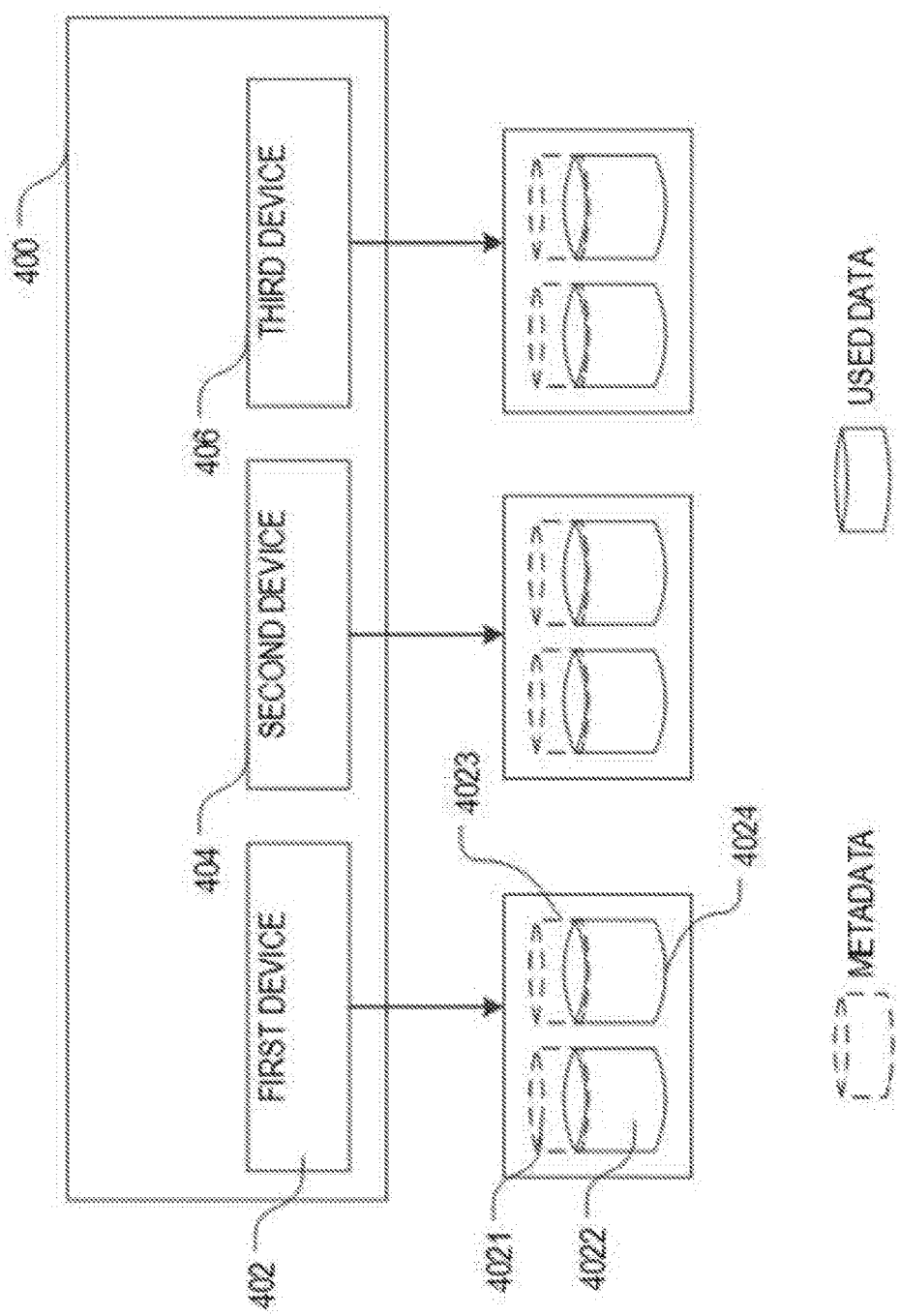
FIG. 4 illustrates a configuration structure diagram of a common SSD cache.

Generally, the embodiments of the present disclosure generally relate to a method and an apparatus for hybrid storage devices. In order to facilitate understanding the technical solutions and advantages of the embodiments of the present disclosure, the configuration and operation flow of a common hybrid storage device will be described with reference to FIG. 4 and FIG. 5. In the data storage or server field, SSDs are more and more used, e.g., as a second-level cache. In this kind of product, a dynamic random access memory (DRAM) cache is usually used as a first-level cache. When an external host accesses a disk array, there are usually two kinds of cache hits: 1) DRAM cache hits, wherein the DRAM cache will first search its cached data; if the DRAM cache search hits, the DRAM cache will use the cached data to respond to a host request; if the DRAM cache search misses, an input/output (IO) access will be shifted to the second-level cache, e.g., an SSD cache; 2) SSD cache hits, wherein the SSD cache will search its cached data; if the search hits, the SSD cache will use its cached data to respond to a read/write request; if the search misses, the SSD cache will shift the IO request to a hard-disk (HDD) matrix to read desired data from the hard disk. It is to be understood that it is slower to read HDD than directly returning the desired data from the DRAM or SSD. With reference to FIG. 4, FIG. 4 illustrates a configuration structural diagram of a common SSD cache 400. The SSD cache 400 for example comprises three SSD paired devices 402, 404, and 406. Each SSD paired device is, for example, composed of two SSDs, wherein each SSD device comprises a first region 4021 or 4023 for storing metadata and a second region 4022 or 4024 for storing the used data. The two SSD devices are configured, for example, with RAID1 technology; therefore, one paired device containing two SSD devices actually only uses a storage capacity of one SSD.

Figure 5:
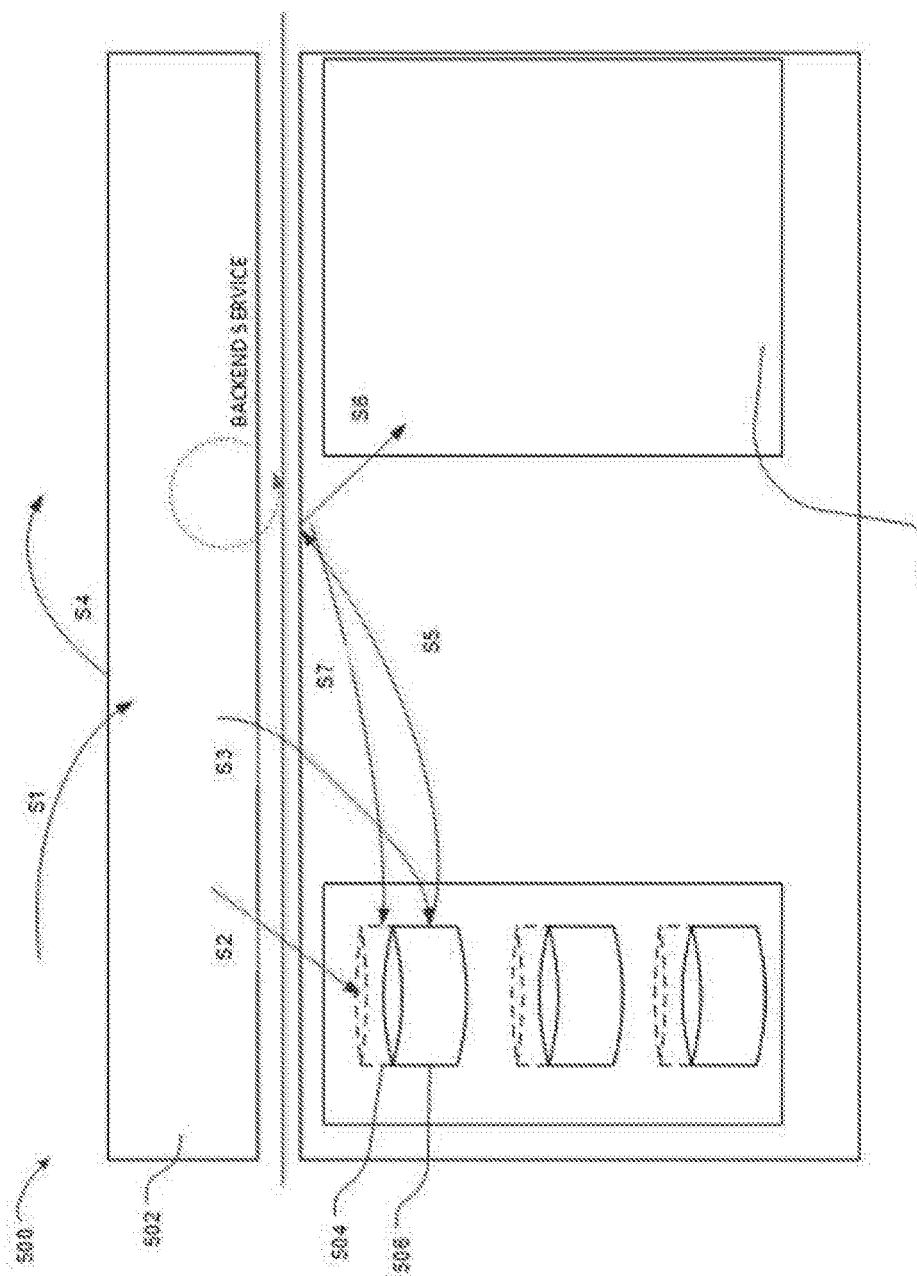
FIG. 5 illustrates an operation diagram of a common hybrid storage device.

Refer to FIG. 5, in which a schematic diagram of operating 500 a common hybrid storage device is presented. When IO (e.g., writing) from for example DRAM accesses an SSD cache 502, as indicated by the arrow S1, in the case of hit, a metadata storage area, e.g., metadata storage area 504, in the SSD cache is updated as indicated by arrow S2. The cache page metadata corresponding to the writing is updated from clean to dirty (the update is a writing into the SSD). Herein, the dirty page or data indicates that the data is stored in the SSD but not stored in the HDD 508, while the dirty page or data indicates that when storing the page or data, it is simultaneously stored in both the SSD and HDD, or it is not stored in the SSD or HDD. Then, as indicated by arrow S3, the writing data is written into the data region used in the SSD, e.g., using the data region 506 (this is another writing into the SSD). Afterwards, as indicated by arrow S4, information indicating the writing is returned to the first-level cache, e.g., DRAM cache. A backend service in the SSD cache 400 scans the SSD and finds that a dirty page exists in the SSD cache; the backend service first reads the page data from the SSD (a reading of the SSD) as indicated by arrow S5, and then as indicated by arrow S6, the dirty page is written into the HDD 508 (a writing into the HDD). Finally, as indicated by arrow S7, metadata of the cache page is updated from dirty to clean (yet another writing to the SSD).

Because the SSD cache only has very few dirty data, much SSD storage space will be wasted by using RAID1 configuration to protect these very few data. Second, because dirty data or page only exists for a period of time in the cache, when both of the two SSDs in an SSD pair fail, the dirty data still has a possibility of being lost. Besides, as illustrated in steps S1-S7 in FIG. 5, one writing from the DRAM results three writing to the SSD, one reading to the SSD, and one writing to the HDD. When writing from the DRAM increases, it will significantly affect the service life of SSD.

Therefore, embodiments of the present disclosure make some improvements. In some cases, particularly when IO access from a host mainly reads data in the SSD cache, embodiments of the present disclosure may multiply the SSD cache space and prolong the SSD service life by compromising on decreasing writing speed.

Figure 1:
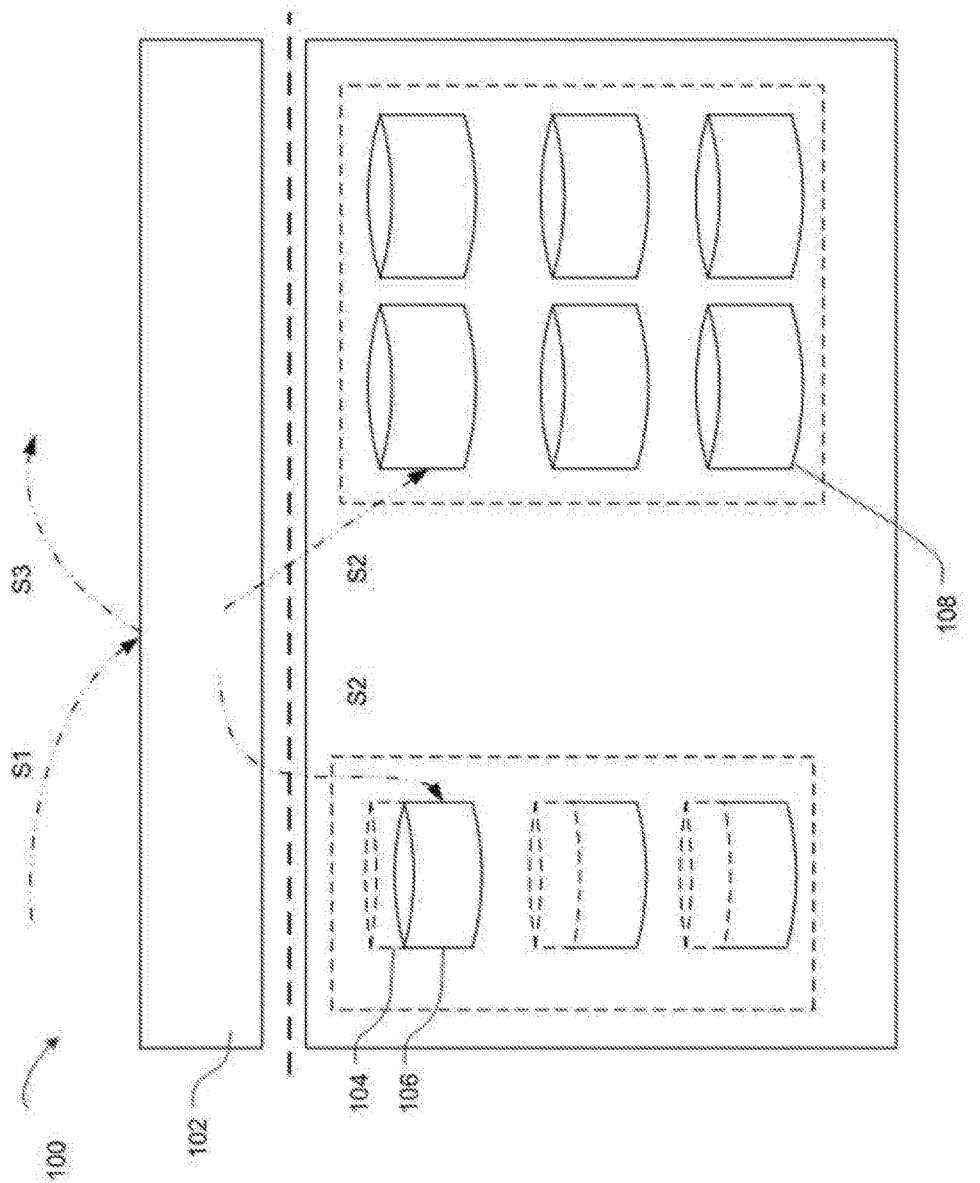
FIG. 1 illustrates an operation diagram according to one embodiment of the present disclosure.

Refer to FIG. 1, in which a schematic diagram of an operation 100 according to one embodiment of the present disclosure is presented. In the example of FIG. 1, the SSD cache 102 does not utilize the RAID technology. i.e., SSDs needn't be paired, but are utilized separately. Compared with the configuration shown in FIG. 4, the storage space of the SSD cache may be multiplied. When the DRAM writes into the SSD cache 102 as indicated by arrow S1, the SSD cache synchronously writes the data into the used data region 106 of the SSD and the HDD 108. In the present disclosure, "synchronous" means data are one-time written into two different types of storage devices, not like what is shown in FIG. 5, where the data is first written into one storage device, then written into a storage device of another type from the one storage device through a backend service. Those skilled in the art should understand, the term "synchronous" in the present disclosure does not exclude a situation in which write operations of two storage devices of different types happen in a time sequence determined by system characteristics in "one-time writing." Therefore, the term "synchronous" does not refer to absolutely "simultaneous" for the write operations of the two storage devices of different types in time sequence.

By synchronously writing data into different storage devices such as SSD and HDD, data security can also be ensured. This is because once one device fails, the other device still stores the same data. Besides, it is to be understood that this technical scheme is particularly advantageous to a hybrid storage device with fewer write operations, because it has a relatively small influence on the overall read/write performance of the hybrid storage device.

Besides, because there is only one writing operation for the access operation to the SSD during the operation procedure of FIG. 1, the times of write and read operations to the SSD is greatly reduced compared with the three writing and one read operations illustrated in FIG. 5, which therefore may significantly prolong the service life of the SSD.

Figure 2:
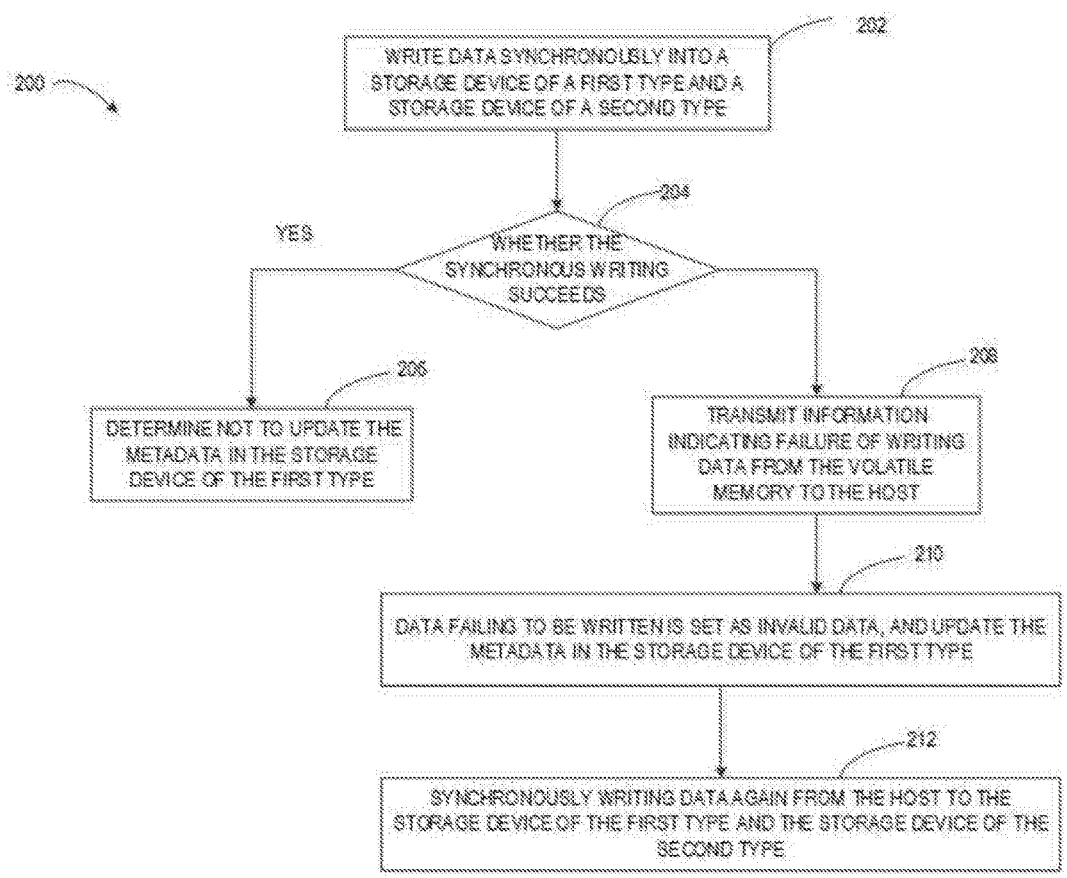
FIG. 2 illustrates a flow diagram of a method according to one embodiment of the present disclosure.

Refer to FIG. 2, in which a flow diagram of a method 200 according to one embodiment of the present disclosure is presented. In step 202, data from the DRAM, for example, is synchronously written into a storage device of a first type (e.g., SSD) and a storage device of a second type (e.g., HDD). Due to the existence a small possibility of failed synchronous writing, it is determined in step 204 whether the synchronous writing succeeds. If the synchronous writing operation succeeds, it is determined in step 206 not to update metadata in the storage device of the first type. As indicated above, because the data is synchronously written into the SSD and HDD, the metadata in the SSD which indicates whether the SSD has dirty data that has not been written into the HDD needn't be updated. In other words, because the used data region in the SSD and the HDD synchronously have written data or do not have the data, the metadata for mapping the stored data conditions of the SSD and the HDD needn't be updated, thereby eliminating write operations for updating metadata in the SSD, reducing write "wear" of the SDD, and thereby prolonging the service life of the SSD.

If the synchronous writing fails, in step 208, a volatile memory (e.g., DRAM) transmits information indicating data failure to an external host. Then, in step 210, the data failing to be written is set to invalid data in the SSD, and corresponding metadata in the SSD is updated. After the external host determines write failure of the previous time, it may re-initiate a write in step 212, i.e., synchronously writing data in the SSD and HDD again from the host, and returning to step 204 till the synchronous write succeeds.

It is to be understood that the first storage device being an SSD and the second storage device being an HDD is only for the sake of depiction, not intended to make limitations to the embodiments of the present disclosure. It is to be understood that based on the understanding of the technical solution, other technical solutions may be conceived. For example, replacing the HDD with other storage device, e.g., a tape; or replacing the SSD with other storage device that needs to reduce write operations.

Figure 3:
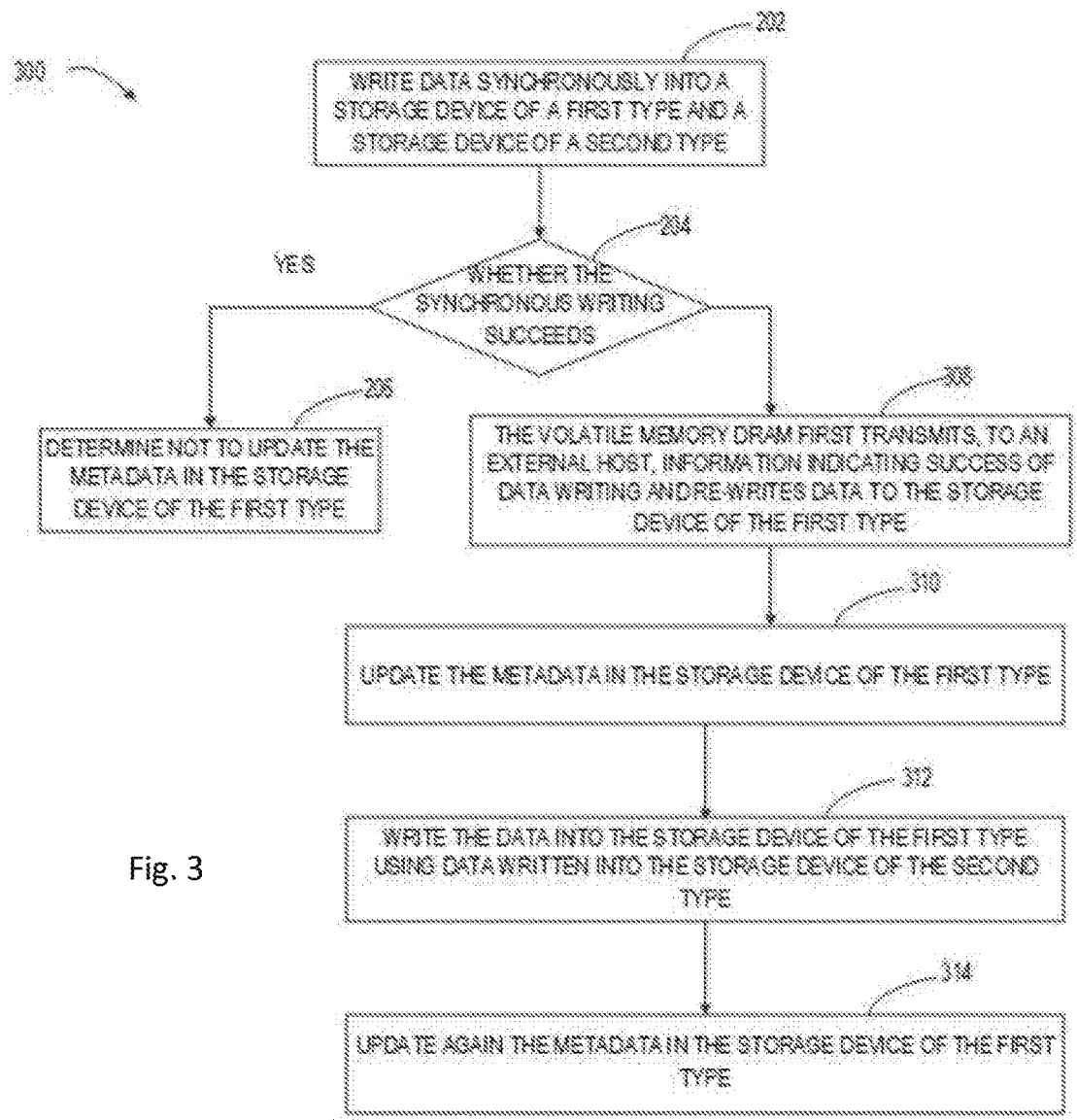
FIG. 3 illustrates a flow diagram of a method according to another embodiment of the present disclosure.

Refer to FIG. 3, in which a flow diagram of a method 300 according to another embodiment of the present disclosure is presented. The method 300 differs from the method 200 only in a processing manner when the synchronous write operation fails. Therefore, steps 202, 204, and 206 in the method 300 will not be detailed. When the synchronous write operation fails, because the data has been buffered in a volatile memory such as DRAM; therefore, in step 308, the volatile memory DRAM first transmits, to an external host, information indicating success of data, writing and re-writes data, to the storage device of the first type (e.g., SSD). In one embodiment, due to failure of writing data, the space that should have stored the data in the SDD may be directly set to invalid data, and then the data is directly written in the HDD; at this time, because SSD and HDD are inconsistent, metadata is updated in step 310. Then, it is notified that the DRAM cache is written successfully. Afterwards, the SSD issues a command to perform the backend execution operation. In step 312, the data stored in the HDD is written in the SDD. At this time, because data in corresponding regions in the SSD and HDD are consistent, metadata is updated again in step 314.

It is to be understood that describing the first storage device as an SSD and the second storage device as an HDD is only for the sake of description, without suggesting any limitations as to the scope of the present disclosure. It is to be understood that based on the understanding of the technical solution, other technical solutions may be conceived. For example, replacing the HDD with other storage device, e.g., a tape or replacing the SSD with other storage device that needs to reduce write operations.

Figure 6:
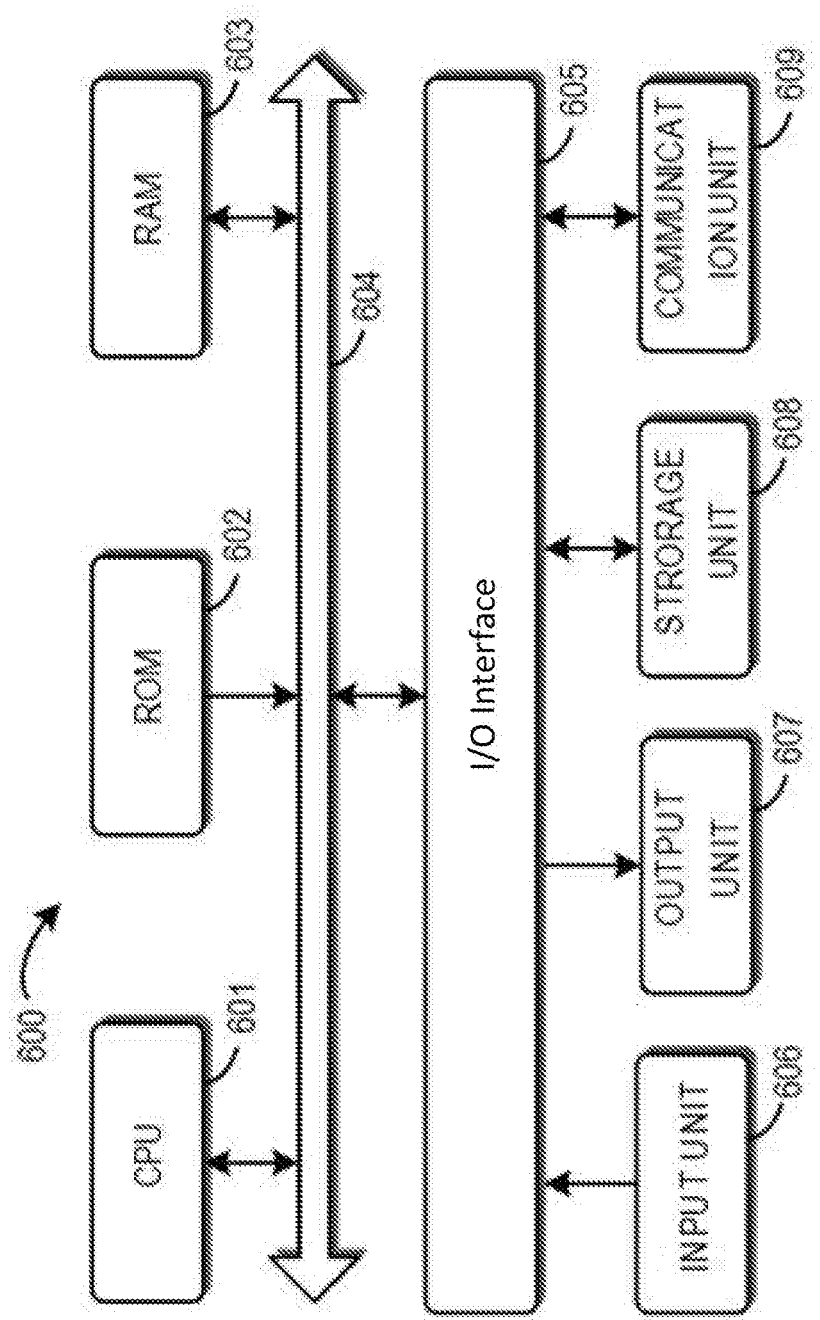
FIG. 6 illustrates a block diagram of an apparatus adapted to implement embodiments of the present disclosure.

Refer to FIG. 6, in which a block diagram of an apparatus 600 that may be used to implement embodiments of the present disclosure is presented. As illustrated in the figure, the apparatus 600 comprises a central processing unit (CPU) 601 which may perform various appropriate actions and processing according to the program stored in a read-only memory (ROM) 602 or a program loaded in the random access memory (RAM) from the storage unit 608. In the RAM 603, there also stores various programs and data needed for the apparatus 600 to operate. The CPU 601, ROM 602, and RAM 603 are connected with one another through a bus 604. An input/output (I/O) interface 605 is, also connected to the bus 604.

Various components in the apparatus 600 are connected to the I/O interface 605, comprising: an input unit 606, e.g., a keyboard, a mouse, etc.; an output unit 607, e.g., a cathode ray tube (CRT), a liquid crystal display (LCD), a loudspeaker, etc.; a memory unit 608, e.g., a magnetic disk, an optical disk, etc.; and a communication unit 609, e.g., a network card, a modem, etc. The communication unit 609 performs communication processing over a network such as the Internet.

The procedure and processing described above, e.g., methods 200 and 300, may be performed by the processing unit 601. For example, in one embodiment, the procedure of implementing the method 200 may be implemented as a computer software program that is tangibly embodied on a machine readable medium. In this embodiment, the computer program may be downloaded and installed through the communication unit 609 from the network, and/or input into the apparatus 600 by the storage unit 608 for the processing unit 601 to execute.

Generally, various embodiments of the present disclosure may be implemented with hardware, specific circuit, software, logic or any combination thereof. Some aspects may be implemented with hardware, while some other aspects may be implemented by firmware or software. The firmware or software may be executed by a controller, a microprocessor, or other computing devices. Although various aspects of the present disclosure may be illustrated and described as block diagrams, flow diagrams, or some other drawing representations, it should be understood that the blocks, device, system, technology or methods described herein may be implemented, in a non-limitative manner, by hardware, software, firmware, specific circuit, or logic, general hardware or controllers, or other computing devices, or a combination of some thereof.

Besides, although the operations are described in a specific order, it should not be understood as requiring such operations to be executed in the illustrated order or executed sequentially in order, or requiring all of the illustrated operations to be executed to achieve a desired outcome. In some cases, multi-task or parallel processing may be advantageous. Similarly, although details of several preferred embodiments have been included in the discussion above, these should not be interpreted as any limitations to the scope of the present disclosure; instead, depiction of the features is only for preferred embodiments. Some features described in some discrete embodiments may also be performed in combination in a single embodiment. On the contrary, various features described in a single embodiment may also be implemented separately in a plurality of embodiments or implemented in any appropriate manner of sub-combinations.

Although the present disclosure is described with specific structural features and/or method actions, it is to be understood that the present disclosure limited in the appended claims is not necessarily limited to the specific features or actions above, the specific features and actions above are only disclosed as exemplary forms for implementing the claims.

What is claimed is:

1. A method for operating a hybrid storage device, the hybrid storage device including a storage device of a first type and a storage device of a second type different from the first type, the method comprising:
   synchronously writing data into the storage device of the first type and the storage device of the second type, wherein the hybrid storage device further includes a volatile memory;
   in response to a failure of the synchronous writing, transmitting, by the volatile memory, information indicating a success of writing the data to a host;
   rewriting the data in the storage device of the first type;

in response to the failure of the synchronous writing, updating metadata in the storage device of the first type;

writing the data in the storage device of the first type using the data written in the storage device of the second type; and updating again the metadata in the storage device of the first type.

2. The method according to claim 1, further comprising:

in response to a success of the writing, maintaining metadata in the storage device of the first type, the metadata mapping conditions of data stored in the storage device of the first type and the storage device of the second type.

3. An apparatus for a hybrid storage device, the hybrid storage device including a storage device of the first type and a storage device of a second type different from the first type, the apparatus including a processing unit configured to:

synchronously write data into the storage device of the first type and the storage device of the second type, wherein the hybrid storage device further includes a volatile memory;

in response to a failure of the synchronous writing, cause the volatile memory to transmit information indicating a success of writing the data to a host;

rewriting the data in the storage device of the first type;

in response to the failure of the synchronous writing, update metadata in the storage device of the first type;

write the data in the storage device of the first type using the data written in the storage device of the second type; and update again the metadata in the storage device of the first type.

4. The apparatus according to claim 3, wherein the processing unit is further configured to:

in response to a success of the writing, maintain metadata in the storage device of the first type, the metadata mapping conditions of data stored in the storage device of the first type and the storage device of the second type.

* * * * *